Dec. 14, 1954     A. B. FOX     2,696,961
ELEVATING MECHANISM

Filed Sept. 1, 1950     2 Sheets-Sheet 1

Arthur B. Fox
Inventor

By Daniel I. Mayne,
J. Griffin Little
Attorney

Dec. 14, 1954     A. B. FOX     2,696,961
ELEVATING MECHANISM

Filed Sept. 1, 1950     2 Sheets-Sheet 2

Arthur B. Fox
Inventor

_United States Patent Office_

2,696,961
Patented Dec. 14, 1954

2,696,961

ELEVATING MECHANISM

Arthur B. Fox, Rochester, N. Y., assignor to Eastman Kodak Company, Rochester, N. Y., a corporation of New Jersey Application September 1, 1950, Serial No. 182,769

3 Claims. (Cl. 248—11)

The present invention relates to an elevating mechanism, primarily although not necessarily, designed for use with photographic slide projectors, motion picture projectors, or similar devices.

It has been common practice to provide such devices with elevating mechanisms for tilting or varying the projection angle so as to position the projected image properly on the viewing screen. Some of these mechanisms constitute a single-threaded member positioned at the front of the device. Such members are very unstable, particularly when at or near their maximum elevation. Other mechanisms provide separate, adjustable legs at the front of the projector, both legs usually requiring separate adjustment to secure the desired screen image location. The disadvantages of this separate adjustable two-leg arrangement will be readily apparent to those in the art.

The present invention overcomes these difficulties by providing a two-legged support or elevating mechanisms positioned at the front of the device. Each leg is separately mounted and is moved in one direction by a spring, the amount of such movement being, however, limited by an adjusting member which serves to move both legs simultaneously in the opposite direction. The result is that both legs move as a unit in both directions so as to maintain the supporting feet carried thereby in a plane parallel to the base plate of the device. The spacing of the legs, and the supporting feet, is such as to insure the desired stability for all adjustments.

The present invention has as its principal object the provision of an elevating mechanism which is stable in all positions of adjustment.

A still further object of the invention is the provision of a two-leg elevating mechanism in which both legs move as a unit and in equal amounts to insure proper lateral leveling of the device.

Yet another object of the invention is the provision of an elevating mechanism which is simple in structure, inexpensive to manufacture, comprises few parts of rugged construction, easy to operate and highly effective in use.

And still another object of the invention is the provision of an elevating mechanism, the adjusting parts of which are self-aligning.

And another object of the invention is the provision of an elevating mechanism which is compact vertically.

To these and other ends, the inventive idea resides in certain improvements and combinations of parts, all as will be hereinafter more fully described, the novel features being pointed out in the claims at the end of the specification.

In the drawings.

Similar reference numerals throughout the various views indicate the same parts.

Figure 1:
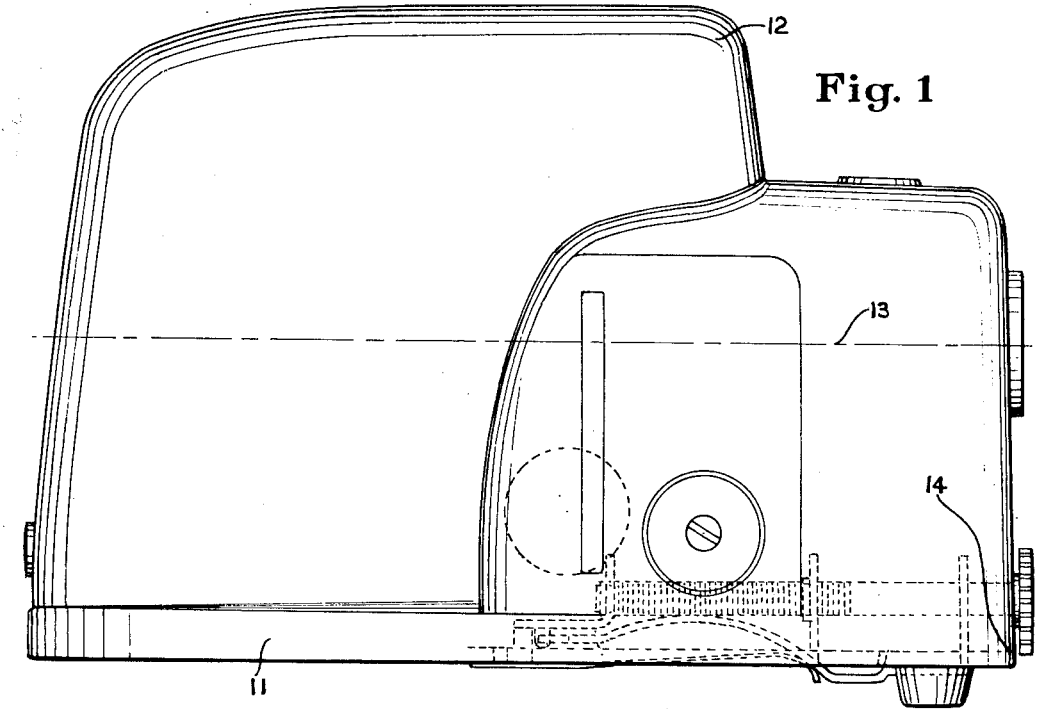
Fig. 1 is a side elevational view of a slide projector, showing the relation thereto of an elevating mechanism constructed in accordance with the preferred embodiment of the present invention.
Figure 2:
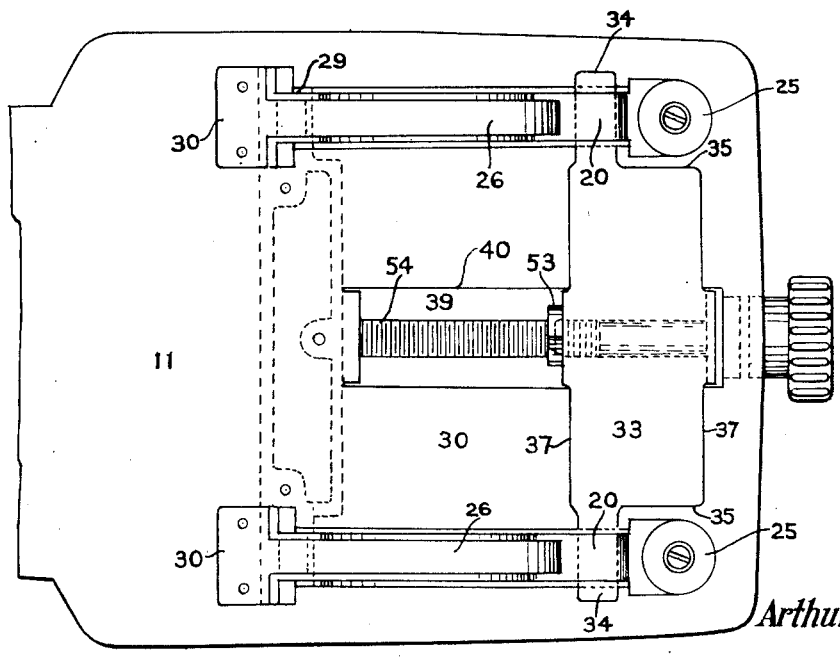
Fig. 2 is a partial bottom view of the structure illustrated in Fig. 1, but on a larger scale than the latter, showing the base plate of the projector and the relation thereto of the elevating device of the present invention.

The elevating mechanism of the present invention is adapted to be connected to a base plate 11 of a projector 12 adjacent the front end of the latter, as shown in Fig. 1, so that the front end of the projector may be raised and lowered to adjust the projection axis 13 to position the image in proper relation on the viewing screen, not shown. The projector itself forms no part of the present invention, and the particular type shown is merely for the purpose of illustrating one form of a device with which the elevating mechanism of the present invention may be used. Also, while the elevating mechanism is shown in connection with a slide projector, it is apparent that such a mechanism is adapted for use with any device which is to be tilted. Therefore, the showing of the slide projector is not intended as a limitation of the present elevating mechanism.

Figure 3:
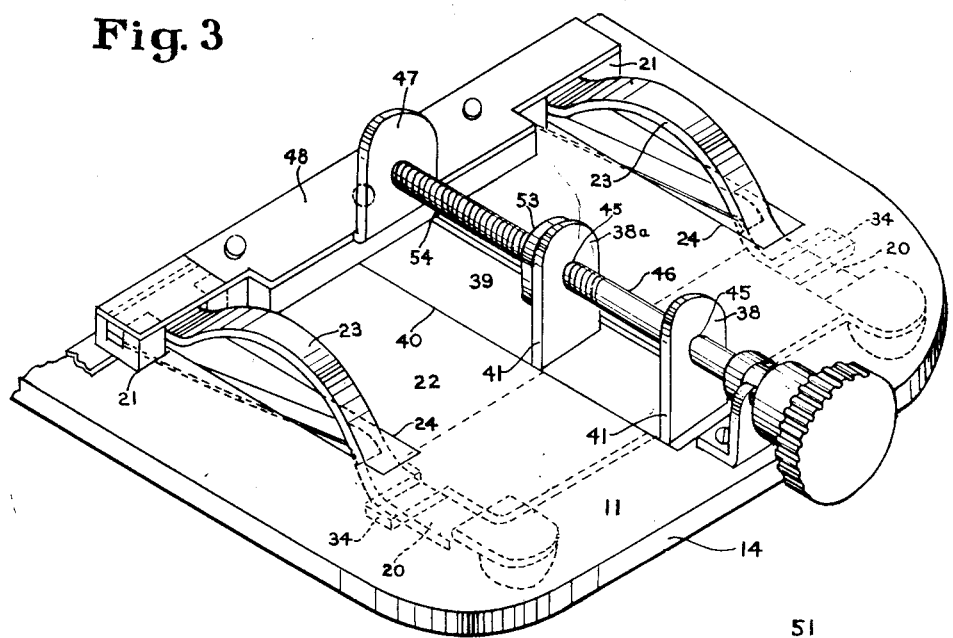
Fig. 3 is a top view of a portion of the base plate disconnected from the projector, showing the various parts of the elevating mechanism, with the mechanism in its elevated position so that the projector will be at its lowest point as shown in Fig. 1.
Figure 5:
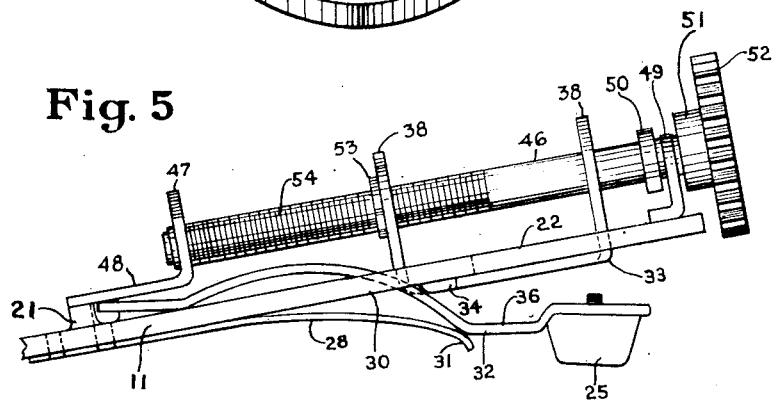
Fig. 5 is a view similar to Fig. 3, but with the mechanism adjusted to raise the projector above its lowest point.
Figure 4:
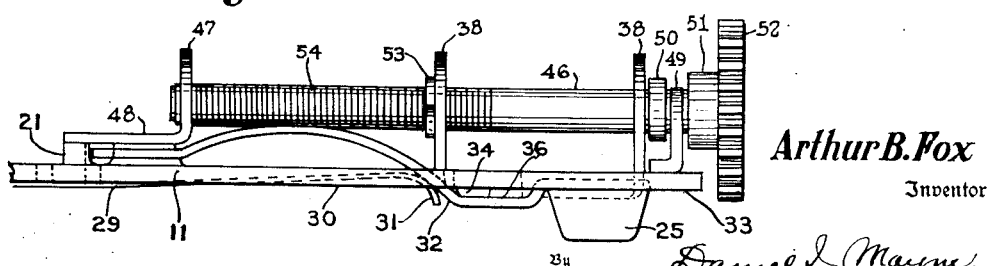
Fig. 4 is a side view of the mechanism illustrated in Fig. 3, and with the mechanism adjusted as in Fig. 3.

The elevating mechanism itself is mounted on the base plate 11 adjacent the front end 14 thereof, so as to raise and lower the front end of the projector as is apparent from an inspection of Fig. 1. In the preferred form, the mechanism comprises a pair of separate and independent legs, broadly designated by the numeral 20. Each leg 20 is pivoted freely in a boss 21 formed on the top 22 of the base plate 11 so that the legs 20 may move or pivot freely about the bosses. The intermediate portion of each leg is formed with a bowed or bent portion 23. Beyond the bowed portion each leg passes through an opening or slot 24 formed in plate 11 so that the free or right end of each leg is positioned below plate 11, as shown in Figs. 3 to 5. The free end of each leg has positioned thereon a supporting foot 25 adapted to engage a suitable supporting surface for the projector. Thus, a pair of parallel legs 20 is provided, each leg being movable about its pivot 21 to adjust the position of the supporting foot 25 toward or away from plate 11.

Each leg 20 has associated therewith a cantilever spring 28 having one end 29 anchored to the under side 30 of the plate 11 adjacent the boss 21, as clearly shown in Figs. 4 and 5. The springs 28 extend forward under the plate 11 and in a vertical alignment with and below the slots 24. The free end 31 of each spring 28 engages the under surface and face 32 of the adjacent leg 20 and tends to move the latter in a counter-clockwise direction about its pivot 21 to move the leg 20 and the supporting foot 25 towards the base plate 11, as is deemed apparent. The springs 28 provide means for moving each leg separately to an elevated position, the legs moving freely through slots 24. Thus, the springs 28 act to rock or pivot the legs in one direction about the pivot points or bosses 21 to permit the front end of the projector to be lowered towards the position shown in Fig. 1. As is well known, it is often necessary or desirable to elevate the front end of the projector to raise the projector axis 13 so that the projected image will fall on the viewing screen. To thus elevate the projector, it is necessary to lower the feet 25 to increase the spacing between the feet and the plate 11 as shown in Fig. 5. To secure this result the legs 20 must be rocked or pivoted in clockwise direction, as viewed in Figs. 4 and 5, to move the feet 25 away from the plate 11. Obviously the amount of such movement will depend upon the degree of tilting necessary to bring the image onto the viewing screen. Therefore, the angular relation of the axis 13 may be altered by rocking the legs 20 in a clockwise direction to lower the supporting feet 25 the proper amount.

In order to rock the legs 20 clockwise, the present invention provides a manually-controlled mechanism which acts against the force of springs 28 but cooperates with the latter to maintain the legs 20, and hence the projector, in any position of adjustment.

In the preferred form, this adjusting mechanism comprises a flat plate-like member 33 positioned to slidably engage the under surface 30 of the plate 11 and spaced forwardly from the pivots 21 of the legs 20, as shown in the drawings. This member 33 is formed from a piece of sheet metal, and has a pair of laterally-extending lugs or fingers 34 which project from the opposite ends 35 of the member 33 and are interposed between the top surface 36 of the legs 20 and the under side 30 of plate 11. It is apparent that if plate 33 is moved or slid to the left, as viewed in Figs. 4 and 5, the lugs 34 will move to the left along the upper or top surfaces 36 of the legs 20. If such leftward movement is continued, the lugs 34 will finally engage the bowed or curved portions 23 and will tend to move upwardly along the portions 23. However, as the plate 11 will prevent upward movement of the member 33, the engagement of the lugs 34 with the bowed portions 23 will serve to cam or move the legs 20 downwardly and in a clockwise direction about their pivots 21 and against the upward force of the spring 28 to lower the supporting feet 25, as shown in Fig. 5. Thus, the bowed portions 23 form, in effect, cams which cooperate with the lugs 34 to move the legs in a direction opposite to that obtained by means of the springs 28. As the plate member 33 moves in a plane against the surface 30 of the plate 11, both legs will be moved equally as a unit. The springs 28 also cooperate with the lugs 34 of the member 33 to retain the legs 20 in any position of adjustment. If, however, the member 33 is moved to the right, the lugs 34 will also move to the right and downwardly along the bowed or cam surfaces 23. Such movement will decrease the pressure applied by the lugs 34 on the legs 20, and the springs 28 will then serve to move the legs upwardly so as to maintain the surface 36 in contact with the lugs 34. By reason of this engagement, the springs 28 will move both legs upwardly as a unit and in equal amounts to maintain the supporting feet 25 in parallel relation with the plate 11. Thus, the lugs 34 and the plate 33 are utilized to move the legs 20 and the supporting feet 25 downwardly to elevate the projection axis, while the springs 28 are employed to move the legs upwardly to shift the feet 25 toward the plate 11 to lower the projection axis. The result is that separate and independent means are employed to adjust the elevating mechanism in opposite directions.

Various devices may be employed for mounting the member 33 for sliding movement on plate 11, and for adjusting the position of the member 33 to adjust the elevation of the projector. In the preferred form, the side edges 37 of plate 33 have turned up therefrom a pair of spaced lugs or ears 38 and 38a which extend through a slot 39 in plate 11 positioned between and parallel to the slots 24 which receive the legs 20. The ears 38 and 38a have a width substantially equal to that of the slot 39 so that the edges 40 of the latter engage the edges 41 of the ears 38 and 38a to guide the latter, and hence the plate 33 and lugs 34, in a sliding movement on plate 11 while maintaining the ears 38 and 38a parallel to legs 20. The ears are formed with aligned apertures 45 through which a rod 46 extends. One end (left end) of the rod 46 is anchored in an upstanding lug or ear 47 formed on the plate 48 which may be secured to or formed integral with the bosses 21 in which the legs 20 are pivoted. The ears 38, 38a and 47 thus provide aligning supports or bearings for the rod 46. The front or right end of the latter rests in an upstanding bearing 49 carried by plate 11 and positioned between a collar 50 and a sleeve portion 51 of an adjusting knob 52 secured to rod 46. The left ear 38a carries a threaded nut 53 adapted to receive a threaded portion 54 of rod 46 so that rotation of the rod by turning knob 52 will cause ears 38 and 38a, and hence plate 33 and lugs 34, to move as a unit toward or away from the pivot points of the legs 20. The direction of movement, obviously will depend upon the direction of rotation of the knob 52.

When the knob 52 is turned in one direction, plate 33 is moved to the left, as viewed in Figs. 4 and 5. Such movement causes the lugs 34 to ride up on the inclined cams or bowed portions 23 of the legs and causes the latter to rock in a clockwise direction to lower the feet 25, such movement being against the action of the springs 28 and serves to tension the latter. However, when the knob 52 is rotated in the opposite direction, the lugs 34 ride downwardly or to the right along the bowed portion 23, and the tensioned springs 28 then serve to move the legs 20 upwardly or in counter-clockwise direction, lifting the feet 35. The final position of the feet depends upon the degree of movement imparted to the rod 46. As mentioned above both legs move as a unit in both directions so that the feet 25 are always maintained parallel to plate 11 to insure that the projector will always be level transversely or laterally. In any position of adjustment the legs 20 are held yieldably between springs 28 and the lugs 34 so that the legs are maintained securely in any position of adjustment, yet the adjustment may be readily and easily changed merely by rotating the knob 52.

The present invention thus provides an elevating mechanism which is stable in all positions of adjustment, yet permits the adjustment to be easily and quickly made. The elevating mechanism is also simple in structure, inexpensive to manufacture, rugged, easy to operate, and highly effective in use. Furthermore, the various parts are held firmly in any position of adjustment. In addition, the entire elevating mechanism is compact vertically so that it can be located in the space that always exists under the lens.

While one embodiment of the invention has been disclosed, it is to be understood that the inventive idea may be carried out in a number of ways. Therefore, this application is not to be limited except as is necessitated by the scope of the present claims.

What I claim and desire to secure by Letters Patent of the United States of America is:

1. An elevating mechanism comprising, in combination, a base plate, a leg pivotally connected at one end to said plate for movement relative thereto, a supporting foot on the other end of said leg, a cantilever spring having one end anchored to said plate adjacent said pivot and the free end engaging said leg to move the latter in one direction about said pivot and relative to said plate to position said foot, a cam surface formed on said leg, a member slidably mounted on said plate, means on said member engaging said surface slidably to move said leg in the opposite direction about said pivot and relative to said plate, and manual control means for positioning said engaging means on said member.

2. An elevating mechanism comprising, in combination, a base plate, a leg pivotally connected at one end to said plate for movement relative thereto, a supporting foot on the other end of said leg, a bowed portion formed on said leg intermediate said pivot and said foot, a cantilever spring having one end anchored to said plate and the free end engaging said portion and tending to move said leg in one direction about said pivot and relative to said plate to position said foot, a member slidably mounted on said plate, means for positioning said member on said plate, a part of said member being positioned to engage and slide along said portion toward said pivot to move said leg in the opposite direction against the action of said spring and cooperating with the latter to maintain the adjustment of said leg relative to said plate, and means for adjusting said member on said plate toward and away from said pivot.

3. An elevating mechanism comprising, in combination, a base plate, a leg pivotally connected at one end to said plate for movement relative thereto, a supporting foot at the other end of said leg, a cantilever spring having one end anchored to the plate adjacent said pivot and the other end engaging said leg and tending to shift the latter in one direction to move said foot toward said plate, a member mounted for sliding movement on said plate toward and away from said pivot, means to position said member on said plate, a cam surface on said leg, a lug on said member movable over said cam to rock said leg in the opposite direction and against the action of said spring to move said foot away from said plate, and a threaded member connected to said member for moving the latter selectively toward and away from said pivot.

References Cited in the file of this patent

UNITED STATES PATENTS

| Number | Name | Date |
|---|---|---|
| 404,396 | Fuller | June 4, 1889 |
| 1,171,523 | Kuhn | Feb. 15, 1916 |
| 1,921,215 | Carpenter | Aug. 8, 1933 |
| 1,994,601 | Wellman | Mar. 19, 1935 |
| 2,395,625 | Heyer | Feb. 26, 1946 |
| 2,525,534 | Ernisse | Oct. 10, 1950 |

FOREIGN PATENTS

| Number | Country | Date |
|---|---|---|
| 269,232 | Great Britain | Apr. 6, 1927 |